(12) United States Patent
Daniels

(10) Patent No.: US 9,377,037 B2
(45) Date of Patent: Jun. 28, 2016

(54) LOCK DEVICE AND METHOD OF USE

(71) Applicant: Ron R. Daniels, Missouri, TX (US)

(72) Inventor: Ron R. Daniels, Missouri, TX (US)

( * ) Notice: Subject to any disclaimer, the term of this patent is extended or adjusted under 35 U.S.C. 154(b) by 141 days.

(21) Appl. No.: 14/206,955

(22) Filed: Mar. 12, 2014

(65) Prior Publication Data

US 2014/0271027 A1    Sep. 18, 2014

Related U.S. Application Data

(60) Provisional application No. 61/789,102, filed on Mar. 15, 2013.

(51) Int. Cl.
| | |
|---|---|
| *E05C 19/00* | (2006.01) |
| *F16B 2/16* | (2006.01) |
| *F16B 19/10* | (2006.01) |
| *E05B 17/20* | (2006.01) |
| *E05C 19/04* | (2006.01) |
| *E05B 15/00* | (2006.01) |

(Continued)

(52) U.S. Cl.
CPC ............... *F16B 2/16* (2013.01); *E05B 15/006* (2013.01); *E05B 17/2011* (2013.01); *E05C 19/009* (2013.01); *E05C 19/04* (2013.01); *F16B 19/109* (2013.01); *F16B 19/1081* (2013.01); *F16B 41/005* (2013.01)

(58) Field of Classification Search
CPC ......... E05C 5/04; E05C 19/04; E05C 19/009; E05B 17/2011; E05B 17/172046; E05B 63/121; E05B 15/006; E05B 53/006; F16B 19/109; F16B 19/1081
USPC ......... 292/194, 195, 197, 198, 212, 251, 252; 411/21, 348
See application file for complete search history.

(56) References Cited

U.S. PATENT DOCUMENTS 1,244,848 A * 10/1917 Gadke ................... F16D 1/0894
                                                                    279/76
1,287,000 A * 12/1918 Greaves .................. E05C 3/042
                                                                    220/325

(Continued)

FOREIGN PATENT DOCUMENTS

| | | | | | |
|---|---|---|---|---|---|
| DE | | 429318 C | * | 5/1926 | .......... E05B 17/2046 |
| DE | | 802433 C | * | 2/1951 | ................ E05C 5/04 |

(Continued)

OTHER PUBLICATIONS

U.S. Appl. No. 13/745,193, filed Oct. 17, 2013, Daniels.

*Primary Examiner* — Carlos Lugo
(74) *Attorney, Agent, or Firm* — Ira Domnitz

(57) ABSTRACT

The present invention, and inventive system, describes a lock system that is designed to be attached to an existing cast iron loose grate and or manhole covers that sits in a cast iron or other material frame allowing the loose grate to be locked into the frame so it cannot be removed from the frame accidently or on purpose without the proper tool to unlock the security locking bolt. In some embodiments of the present invention, the present invention does not need a frame and interacts with the wall holding the cover directly. In at least one embodiment the present invention operates by an upper and lower section. The lower section may have multiple bars that operate independently of each other. These lower sections can rotate about a screw which is located in a hole drilled through a grate or manhole, such that the lower sections can rotate across the manhole cover and extrude past the radius of the manhole cover.

12 Claims, 6 Drawing Sheets

(51) Int. Cl.
*E05C 5/04* (2006.01)
*F16B 41/00* (2006.01)

(56) References Cited

U.S. PATENT DOCUMENTS

| | | | | |
|---|---|---|---|---|
| 1,370,109 | A | * | 3/1921 | Hart .................... E05C 3/041 292/197 |
| 1,433,430 | A | * | 10/1922 | Sidney ............... E05B 65/0057 292/212 |
| 1,441,845 | A | * | 1/1923 | Gates .................... E05B 3/06 292/356 |
| 1,807,527 | A | * | 5/1931 | Hanny ................ E05B 65/006 248/906 |
| 2,822,986 | A | * | 2/1958 | Schreier .................. E01B 9/14 238/377 |
| 3,402,958 | A | * | 9/1968 | Barry .................... E05C 3/042 292/62 |
| 3,523,675 | A | | 8/1970 | Grove et al. |
| 3,549,184 | A | * | 12/1970 | Anderson ............. E05B 13/005 292/195 |
| 3,976,095 | A | | 8/1976 | Koch et al. |
| 3,980,099 | A | | 9/1976 | Youngblood |
| 4,334,578 | A | * | 6/1982 | Labrum ................. B65D 55/14 166/75.13 |
| 4,365,539 | A | | 12/1982 | Martin et al. |
| 4,483,639 | A | * | 11/1984 | McCandless, II ........ B25G 3/18 292/252 |
| 4,512,597 | A | * | 4/1985 | Nabb ................... E05B 63/121 292/143 |
| 4,583,775 | A | * | 4/1986 | Bisbing ............... E05B 17/0025 292/64 |
| 4,679,835 | A | * | 7/1987 | Weinerman ............ E05C 3/042 292/197 |
| 4,817,663 | A | | 4/1989 | McAndrews |
| 4,838,218 | A | | 6/1989 | Sato et al. |
| 4,878,367 | A | * | 11/1989 | Bisbing ................ E05B 35/008 70/404 |
| 5,037,064 | A | | 8/1991 | Pond |
| 5,143,114 | A | | 9/1992 | Daniels |
| 5,152,161 | A | * | 10/1992 | Lee .................... E05B 63/0013 292/212 |
| 5,234,236 | A | * | 8/1993 | Gromotka ........... E05B 63/0056 292/194 |
| 5,263,796 | A | | 11/1993 | de Waal |
| 2,342,635 | A | | 2/1994 | Barber et al. |
| 5,427,135 | A | | 6/1995 | Kieper |
| 5,470,046 | A | | 11/1995 | Mack et al. |
| 5,634,359 | A | * | 6/1997 | Huebschen ............. E05B 9/086 70/367 |
| 5,934,646 | A | | 8/1999 | Tamura et al. |
| 5,961,162 | A | * | 10/1999 | Glaser ...................... E05B 9/08 292/198 |
| 6,164,318 | A | | 12/2000 | Dixon |
| 6,296,286 | B2 | * | 10/2001 | Glaser ......................... 292/198 |
| 6,443,505 | B1 | * | 9/2002 | Linares .................. E05B 17/04 292/1 |
| 6,546,765 | B1 | * | 4/2003 | Linares ................. E05B 13/108 16/412 |
| 6,568,226 | B1 | * | 5/2003 | Ramsauer ........... E05B 17/0025 292/114 |
| 6,681,795 | B2 | | 1/2004 | Beals et al. |
| 7,350,382 | B2 | * | 4/2008 | Hoffmann ........... E05B 17/0004 292/194 |
| 7,377,137 | B1 | * | 5/2008 | Bednarz ................ E05B 63/121 403/322.2 |
| 7,717,136 | B2 | | 5/2010 | Sakai |
| 8,720,874 | B2 | * | 5/2014 | Tschida ................ F16B 19/109 269/229 |
| 8,920,063 | B1 | * | 12/2014 | Easley .................. F16B 21/165 269/48.1 |
| 2005/0044907 | A1 | * | 3/2005 | Agbay ................ E05B 65/0089 70/164 |
| 2008/0157020 | A1 | | 7/2008 | Rose et al. |
| 2009/0315342 | A1 | * | 12/2009 | Dalton, Jr. ............. E05C 3/042 292/197 |
| 2010/0200793 | A1 | | 8/2010 | Nguyen |
| 2011/0240157 | A1 | | 10/2011 | Jones et al. |
| 2011/0309637 | A1 | * | 12/2011 | Beck ....................... B60K 15/04 292/57 |
| 2012/0248790 | A1 | | 10/2012 | Costabel et al. |
| 2013/0133383 | A1 | * | 5/2013 | Solomon ................ E05B 63/121 70/34 |

FOREIGN PATENT DOCUMENTS

| | | | | |
|---|---|---|---|---|
| FR | 1030872 | A | * 6/1953 | ............ E05B 63/121 |
| GB | 2191239 | A | * 12/1987 | ............ B25B 13/485 |
| GB | 0905339 | A1 | * 3/1999 | ............ E05C 3/042 |

* cited by examiner

LOCK DEVICE AND METHOD OF USE

CROSS-REFERENCE TO RELATED APPLICATIONS

This application claims priority to U.S. provisional patent application 61/789,102 filed Mar. 15, 2013, which are incorporated by reference herein in their entirety.

STATEMENT REGARDING FEDERALLY SPONSORED RESEARCH

Not applicable.

BACKGROUND

The present invention, and inventive system, is a new and novel locking mechanism that can be used as a lock down system for loose cast grates and or manhole covers to prevent accidental or unwanted removal of the grate from its frame without the proper security removal tool. In several embodiments, the present invention prevents the previous problems associated with other prior art in which persons remove the grates and/or manhole covers though use of generic tools. The present invention uses proprietary technology to prevent the removal of grates and/or manhole covers through the use of generic tools.

SUMMARY

In various embodiments, the present invention describes a lock system that is designed to be attached to an existing cast iron loose grate, any recessed cover with a frame and/or a manhole cover that sits in a cast iron or other material frame allowing the loose grate, or cover, to be locked into the frame so it cannot be removed from the frame accidently or on purpose, without the proper tool to unlock the security locking bolt.

In at least one embodiment, the present invention operates by use of an upper and lower section, or bases. The lower section, or lower base has multiple extended members that operate to brace the cover to the cover frame when in operation. These lower sections can rotate about a screw, or lower member. During operation, the lower member is located in a hole drilled through cover, grate or manhole, such that the lower sections can rotate across the lower sections of the cover and extrude past the radius of the cover frame.

In various embodiments of the present invention, the present invention may be constructed with an elongated body with unique shapes and dimensions cut into the unit so as to fit into a variety of openings, or tubulars, with interior walls, or frames. In various embodiments, the present invention is not dependent on any unique characteristic added, or removed, from the locking unit, that does not affect the overall functionality of the locking screw, spherical balls and/or the hole openings for the spherical balls found in portions of the present invention.

In one embodiment of the present invention, the inventive system is designed to maximize the overall strength of the locking unit for recessed covers by using applied force on both the recessed cover and the circumference, curves, or straight, edge of the recessed frame or ring. In another embodiment of the present invention the present locking device locks on the top of a tubular, or orifice, with an interior wall therein preventing and movement or use of the tubular, or orifice, and preventing the removal of the inventive device.

In one embodiment of the present invention the present invention comprises and improved locking system with a hollowed three dimensional top base with a hole in a top region, multiple holes in the side region adjacent to the top region, and a threaded lower region; a lower three dimensional base with a large orifice and two small orifices; an upper nut; a lower nut; an extended member with several orifices; attachment pins; several small spheres of larger diameter than the multiple holes in the side region; at least one large sphere of larger diameter that the small spheres; a locking screw which can be inserted into the hole in the top region of said base; said locking screw mechanically engage with said large sphere such that when rotated said locking screw causes the large sphere to move relative to the locking screw and to force said small spheres to extrude from said base via said multiple holes; said threaded lower region is threaded with said upper nut; said threaded lower region is inserted in mechanical communication with said large orifice of said lower base with a region of said threaded lower region extruding through said lower base; said lower nut is threaded with said threaded lower region extruding through said lower base; and said extended member is attached to said lower base by inserting said attaching pins though said orifices of said extended member and then through said smaller orifices of said lower base.

In several embodiments of the present invention, said hole in top region is threaded; and said locking screw is threaded to mechanically engage with said hole in top region. In several embodiments of the present invention, said top region has an engagement face. In several embodiments of the present invention, the improved locking system further comprises a turnkey unit with male engagement member for engaging said engagement face. In several embodiments of the present invention, improved locking system further comprises said upper base is substantially cylindrical in shape. In several embodiments of the present invention, the improved locking system further comprises: a key with a male interface in a unique geometric configuration; said locking screw further comprises a cover for said locking screw; said cover further comprising and a female interface with a unique geometric configuration designed to interface with said key.

In several embodiments of the present invention the present invention comprises the method for use of an improved locking system comprising; Providing an improved lock system comprising; a hollowed three dimensional top base with a hole in a top region, multiple holes in the side region adjacent to the top region, and a threaded lower region; said top region has and engagement face; a turnkey unit with male engagement member for engaging said engagement face; a lower three dimensional base with a large orifice and two small orifices; an upper nut; a lower nut; an extended member with several orifices; attachment pins; several small spheres of larger diameter than the multiple holes in the side region; at least one large sphere of larger diameter that the small spheres; a locking screw which can be inserted into the hole in the top region of said base: mechanically attaching said turnkey unit with male engagement member for engaging said engagement face to said engagement face therein; rotating said turnkey unit with male engagement member for engaging said engagement face; wherein said rotation of the turnkey unit with male engagement member for engaging said engagement face upper base will cause the upper nut to move and the lower nut to insert itself partially into the semicuboidal indention causing the lower base to rotate, and rotate up the lower threaded region. In one embodiment of the present invention, the present invention comprises an improved locking system comprising; a hollowed three dimensional top base with a hole in a top region, multiple holes in the side region adjacent to the top region, and a threaded lower region; a lower three dimensional base with a large orifice; an upper nut; a lower nut; several small spheres of larger diameter than the multiple holes in the side region; at least one large sphere of larger diameter that the small spheres; a locking screw which can be inserted into the hole in the top region of said upper base; said locking screw mechanically engage with said large sphere such that when rotated said locking screw causes the large sphere to move relative to the locking screw and to force said small spheres to extrude from said base via said multiple holes; said threaded lower region is threaded with said upper nut; said threaded lower region is inserted in mechanical communication with said large orifice of said lower base with a region of said threaded lower region extruding through said lower base; said lower nut is threaded with said threaded lower region extruding through said lower base. In one embodiment of the present invention said lower base is a cam.

In some embodiments of the present invent the method for use further comprises engaging said lower base with a frame wall by said rotation up the lower threaded region. In one embodiment of the present invention, the method for use of an improved locking system further comprises disengaging said lower base with a frame wall by said counter rotation down the lower threaded region. In one embodiment of the present invention, the method for use of an improved locking system further comprises providing a locking screw which can be inserted into the hole in the top region of said base and rotating said locking screw mechanically so as to engage with said large sphere such that when rotated said locking screw causes the large sphere to move relative to the locking screw and to force said small spheres to extrude from said base via said multiple holes and engage the inner tubular wall. In one embodiment of the present invention, the method for use of an improved locking system further comprises counter-rotating said locking screw so that small spheres retract into said base.

In one embodiment of the present invention, the present invention comprises the method for assembling an improved locking system comprising; attaching a hollowed three dimensional top base with a hole in a top region, multiple holes in the side region adjacent to the top region, a threaded lower region; and lower three dimensional base with a large orifice and two small orifices an upper nut; attaching an extended member to a lower base with a large orifice; inserting said threaded lower region in mechanical communication through said large orifice located on a lower base with a region of said threaded lower region extruding through said lower base; threading as lower nut with said threaded lower region extruding through said lower base with a large orifice, and attaching a washer and a screw below the lower not onto the threaded lower region. In one embodiment of the present invention, the present invention further comprises the method of placing several small spheres of larger diameter than the multiple holes in the side region into said top base; and rotating said locking screw mechanically so as to engage with said large sphere such that when rotated said locking screw causes the large sphere to move relative to the locking screw and to force said small spheres to extrude from said base via said multiple holes.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
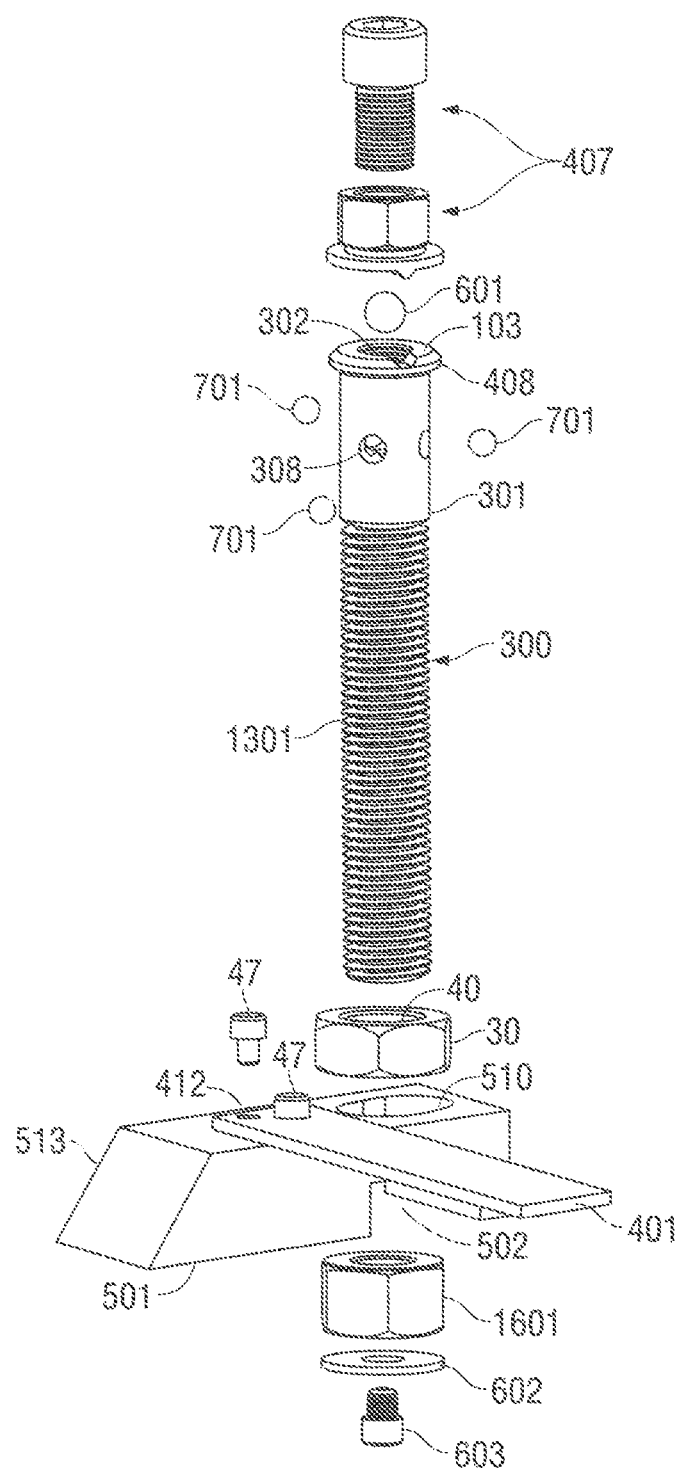
FIG. 1 illustrates one embodiment of the present invention in partial exploded view with the turn locking device.

In the following description, certain details are set forth such as specific quantities, sizes, etc. . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. "Ring" as defined in the present disclosure refers to any frame for a recessed cover, regardless of shape. "Tubular" as defined herein includes any object with solid exterior walls and a hollow interior with an opening. "Small sphere" as defined herein includes any object with solid three dimensional shape, which maybe spike shaped, spherical, cylindrical or other three dimensional shape. "Large sphere" as defined herein includes any object with solid three dimensional shape, which maybe spike shaped, spherical, cylindrical or other three dimensional shape.

One or more illustrative embodiments incorporating the invention disclosed herein are presented below. Applicants have created a revolutionary, and novel security system for recessed covers with and without frames.

One embodiment of the present inventive lock system 300, with the turn locking device 407 is shown in a partial exploded view in FIG. 1. Turn locking device 407 is explained in more detail in FIG. 7. In several preferred embodiments, the present invention is a locking member that is designed to lock, or hold down recessed metal covers 1500. Although it is envisioned that other applications of the present inventive device could be executed. In several embodiments of the present invention, FIG. 1, the present inventive lock system is designed to fit into a pre-drilled hole or orifice 115 that is made on a cover 1500. FIG. 8. The cover 1500 can be a recessed cover, such as a manhole, and maybe comprised of a variety of materials, including but not limited to lead, iron, steel or other materials used for a cover. FIG. 8. In various embodiments of the assembled form of the inventive lock system 300, the inventive lock system 300 may have several parts including, but not limited to, the locking the turn locking device 407, the large sphere(s) 601, the smaller spheres 701, and the upper base 301.

Figure 2:
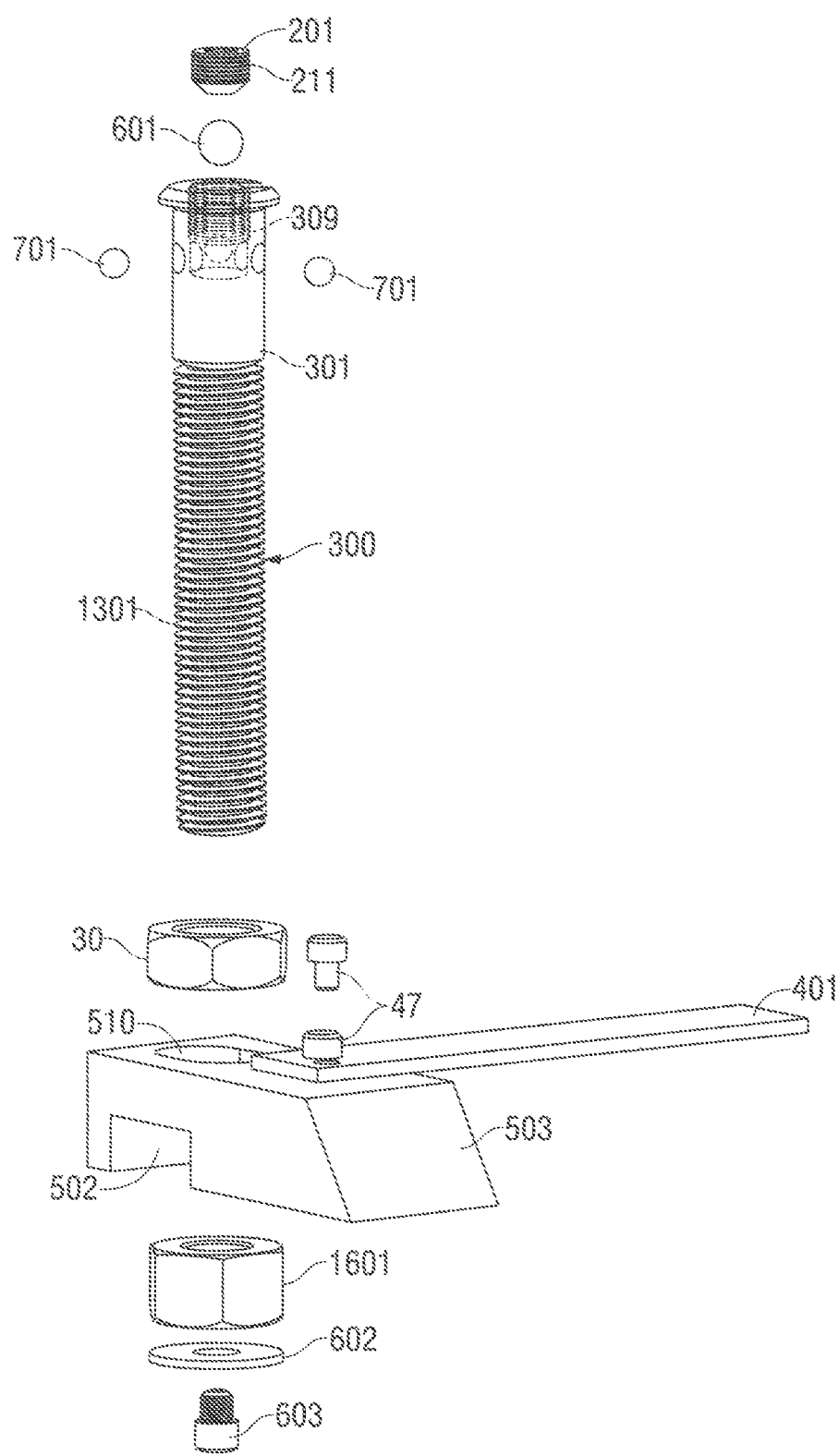
FIG. 2 illustrates one embodiment of the present invention in partial exploded view with the locking screw.
Figure 4:
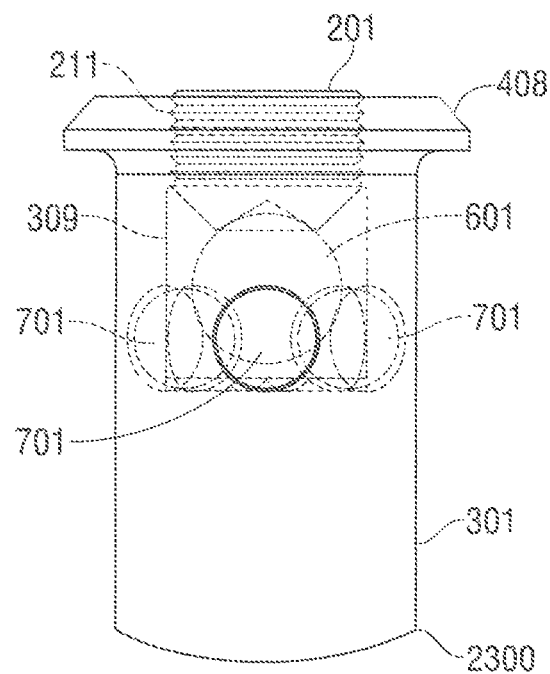
FIG. 4 illustrates one embodiment of the upper base in cross sectional view.

As illustrated, in one embodiment of the present invention, the invention has a cylindrical upper base 301, although other three dimensional geometric shapes can be used in the present invention, including cubes, spheres, cones, cubes or other three dimensional shapes. In several embodiments of the present invention, the upper base 301 may be constructed of iron, wood, steel, plastics, or other materials utilized to provide a base for suitable applications. As illustrated, in one embodiment of the present invention, the invention has a spherical large sphere(s) 601, although other three dimensional geometric shapes can be used in the present invention, including cubes, spheres, cones, cubes or other three dimensional shapes. In many embodiments of the present invention it is preferable that the large sphere(s) 601 be of a larger size than the small spheres 701. In several embodiments of the present invention, the large sphere(s) 601 may be constructed of iron, wood, steel, plastics, or other materials utilized to provide a sphere for suitable applications. As illustrated, in one embodiment of the present invention, the invention has a spherical small sphere(s) 701, although other three dimensional geometric shapes can be used in the present invention, including cubes, spheres, cones, cubes or other three dimensional shapes. In several embodiments of the present invention, the small sphere(s) may be constructed of iron, wood, steel, plastics, or other materials utilized to provide a small sphere for suitable applications. In several embodiments of the present invention, the locking screw 201 may be constructed of iron, wood, steel, plastics, or other materials utilized to provide a locking screw for suitable applications, (As shown in FIG. 2). Also illustrated is the large sphere(s) 601 with a spherical shape, however, there may be other embodiments of the present invention in which the large sphere(s) are beveled, square or other three dimensional geometric shape. FIG. 4 illustrates one embodiment of the present invention, or inventive lock system 300, when in partial cross sectional view. As illustrated, base 301 is preferably hollow with a solid bottom and hollow interior 103, and preferably constructed to have two sets of openings: the upper opening 302 and the small sphere openings 308.

FIG. 1 illustrates one embodiment of the present invention, or lock system 300, partial exploded view. In many embodiments of the present invention the turn locking device 407 can be constructed of variable sizes such that it will fit onto the proprietary face 408 of the upper base 301.

FIG. 1 illustrates one embodiment of the present invention, or inventive lock system 300, in partial exploded view. In many embodiments of the present invention the upper base 301 has a lower section 1301 which maybe threaded in a male fashion as is known in the art. Lower section 1301 maybe preferably constructed of the same materials as the upper base 301. In several embodiments of the present invention, lower section 1301 has a hollowed portion at the end of the threads designed to engage a screw, lower screw 603, such as a grub nut screw. It is envisioned, that the lower section 1301 is threaded in such a manner as to allow for the mechanical interaction of counterthreads 40 such as found in secure nuts 30 and 1601. Also illustrated in FIG. 1 is the lower section secure nut 30 and the extended member secure nut(s) 47. In many embodiments of the present invention it is preferable that the secure nuts 30 are preferably constructed with female thread adaptors 40 to mechanically engage the lower section threads 1301 when the present inventive device is installed. The extended member secure nut(s) 47 is preferably constructed to mechanically engage the extended member 401 when the extended member 401 is attached to the lower base 601. In several preferred embodiments of the present invention the extended member 401 has orifice(s) 412 which is further secured by a secure screw 47. In several preferred embodiments of the present invention the screw 47 may be pinched or threaded so as the hold the secure screw 47 in place, therein securing the extended member 401 when the present inventive device is assembled with the base 501.

FIG. 1 illustrates one embodiment of the present invention, or inventive lock system 300, in partial exploded view. In many embodiments, the present invention has a lower base 501 which maybe in a proprietary geometric three dimensional shape. As illustrated, the lower base 501 is in a modified cuboid shape with an inclined plane 503 on one and a semicuboid indention 502 on the lower face distal to the inclined plane 503. Also illustrated is the orifice 510 on the upper face 513 of the lower base 501 which is designed, to prevent upper nut 30 from passing through the base 510 when the present inventive device is assembled. In several preferred embodiments of the present invention, the secure nut 30 has a wider diameter than the orifice 510. Lower base 501, also has the orifices 505 for securing the extended member 401 with the nut(s) 47. See FIG. 5. In several embodiments of the present invention, the lower base 501 may be constructed of iron, wood, steel, plastics, or other materials utilized to provide a lower base 501 for suitable applications.

FIG. 1 illustrates one embodiment of the present invention, or inventive lock system 300, in partial exploded view. In many embodiments, the present invention has and extended member 401. As illustrated, the extended member is in a modified cuboid shape with an orifice(s) 412. In several embodiments of the present invention, the orifice 412 is designed to receive and be in mechanical communication with screw 47. In several embodiments of the present invention, the extended member 401 may be constructed of iron, wood, steel, plastics, or other materials utilized to provide a lower base for suitable applications. In many embodiments of the present invention, it is envisioned that the extended member 401 be longer in length than lower base 501. In such embodiments, the extended member 401 may act as an additional lock with a frame lip 1515 if the inclined plane 503 rotates past the frame lip. See FIGS. 5 and 8.

FIG. 1 illustrates one embodiment of the present invention, or lock system 300, in partial exploded view. In many embodiments, the present invention has a lower nut 1601, a washer 602 and a lower screw 603. In several embodiments of the present invention, the a lower nut 1601, a washer 602 and/or a lower screw 603 may be constructed of iron, wood, steel, plastics, or other materials utilized to provide a lower base for suitable applications. Lower nut 1601 is preferably designed to threadably engage the threads of the lower section 1301 when the present inventive device is assembled. Washer 602 and lower screw 603 are preferably designed to engage the lower nut 1601 in the manner typically known in the art for prevention of the rotation of the lower nut 1601 once the present inventive device is engaged.

As shown in FIG. 2, one embodiment of the present inventive lock system 300 is shown in a partially exploded view. In several preferred embodiments, the present invention is a locking member that is designed to lock, or hold down recessed metal covers. In several embodiments of the present invention. FIG. 2, is designed to fit into a pre-drilled hole or orifice 115 that is made on the present metal recessed cover 1500. FIG. 8. FIG. 2 illustrates many of the same features as FIG. 1.

In various embodiments of the assembled form of the lock system 300, the lock system 300 may have several parts including the locking screw 201, the large sphere(s) 601, the smaller spheres 701, and the upper base 301. As illustrated, in one embodiment of the present invention, the invention has a cylindrical upper base 301, although other three dimensional geometric shapes can be used in the present invention, including cubes, spheres, cones, cubes or other three dimensional shapes. In several embodiments of the present invention, the upper base 301 may be constructed of iron, wood, steel, plastics, or other materials utilized to provide a base for suitable applications. As illustrated, in one embodiment of the present invention, the invention has a spherical large sphere (s) 601, although other three dimensional geometric shapes can be used in the present invention, including cubes, spheres, cones, cubes or other three dimensional shapes. In many embodiments of the present invention it is preferable that the large sphere(s) 601 be of a larger size than the small spheres 701. In several embodiments of the present invention, the large sphere(s) 601 may be constructed of iron, wood, steel, plastics, or other materials utilized to provide a sphere for suitable applications. As illustrated, in one embodiment of the present invention, the invention has a spherical small sphere (s) 701, although other three dimensional geometric shapes can be used in the present invention, including cubes, spheres, cones, cubes or other three dimensional shapes. In several embodiments of the present invention, the small sphere(s) may be constructed of iron, wood, steel, plastics, or other materials utilized to provide a small sphere for suitable applications. In several embodiments of the present invention, the locking screw 201 may be constructed of iron, wood, steel, plastics, or other materials utilized to provide a locking screw for suitable applications. In several embodiments of the present invention the locking screw 201 has threading 211 which can mechanically engage the locking threads 309 on the base 301 when in operation. See FIG. 4). In several embodiments of the present invention the locking screw 201 has threading 211 which can mechanically engage the locking threads 309 in the base 301 when in operation. FIG. 4 also illustrates in one embodiment of the present invention, the small spheres 701 with a spherical shape, however, there may be other embodiments of the present invention in which the small spheres are beveled, square or other three dimensional geometric shape.

FIG. 2 also illustrates in one embodiment of the present invention, the small spheres 701 with a spherical shape, however, there may be other embodiments of the present invention in which the small spheres are beveled, square or other three dimensional geometric shape. Also illustrated is the large sphere(s) 601 with a spherical shape, however, there may be other embodiments of the present invention in which the large sphere(s) are beveled, square or other three dimensional geometric shape.

FIG. 2 illustrates one embodiment of the present invention, or lock system 300, partial exploded view. In many embodiments of the present invention the locking screw 201 can be constructed of variable sizes such that it will fit into various size upper base 301 through upper opening 302. As illustrated, in several preferred embodiments of the present invention, the locking screw 201 is constructed to have threading 211 on the outer edges which can engage the counter locking threads 309 that are located, in several embodiments of the present invention, in the upper opening 302 in a manner known in the art for threading engagement.

Figure 3A:
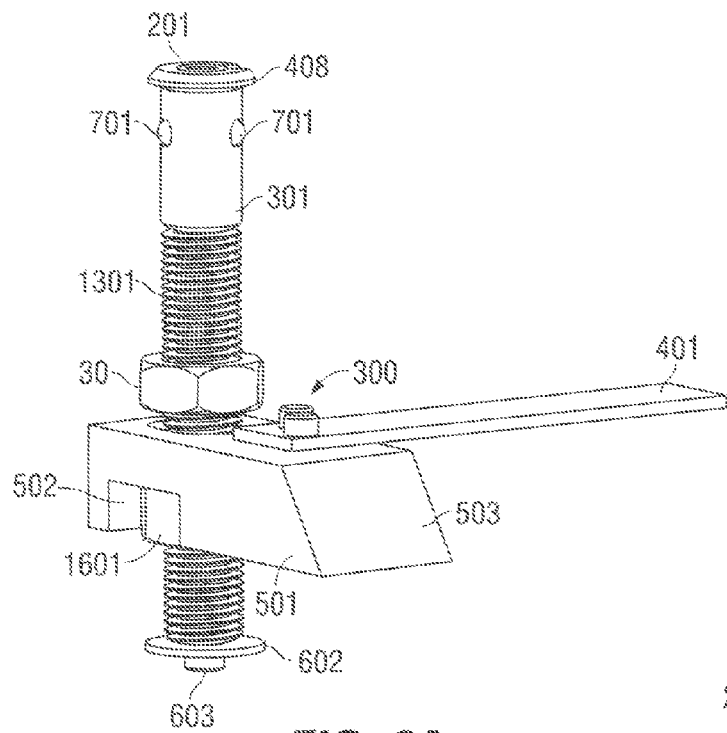
FIG. 3A illustrates one embodiment of the present invention in assembled view with the locking screw.

FIG. 3A illustrates one embodiment of the present invention, or lock system 300, in assembled view. In various embodiments of the assembled form of the locking screw 201, the large sphere(s) 601, the smaller spheres 701, and the upper base 301 have all been previously assembled together. The lower section 1301 is threaded with the nut 30. The lower section 1301 is also placed into the lower base orifice 510 as well as with the lower nut 1601. The lower nut 1601 is secured to the semicuboid indention 502. Also shown is the lower section 1301 being secured by the washer 602 and the screw 603. As illustrated this is one embodiment of the present invention in a fully engaged position (but not attached to a recessed cover).

Figure 3B:
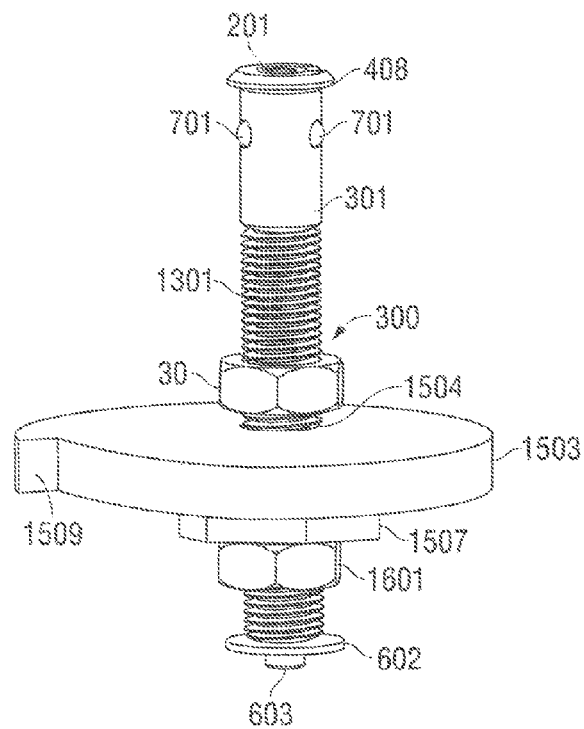
FIG. 3B illustrates one embodiment of the present invention in assembled view with the locking screw.

FIG. 3B illustrates one embodiment of the present invention, or lock system 300, in assembled view. In various embodiments of the cam 300, the cam can have various modifications that can allow the unit to bite better into the surrounding material that it may tension lock into such as a chamfered edge, an angled cut edge, a cerate edge, or any other edge that can allow for a better bite into the surrounding materials that the unit, or cam 300 is biting into. In various embodiments of the assembled form of the locking screw 201, the large sphere(s) 601, the smaller spheres 701, and the upper base 301 have all been previously assembled together. The lower section 1301 is threaded with the nut 30. The lower section 1301 is also placed into the lower base orifice 1504 as well as with the lower nut 1601. The lower nut 1601 is secured to the large washer 1507. Also shown is the lower section 1301 being secured by the washer 602 and the screw 603. In many embodiments of the present invention, this washer is not a separate unit. 1507 is just another geometry of 1503 that is designed to allow for the simultaneous rotation of both cam 1503 and lower nut 1601. It works very similar in nature as semicuboid 502 does. It is also envisioned that the geometric shape of 1507 can be cut into the bottom of 1503 as opposed to just being an extrusion from it like seen in the drawings. As illustrated this is one embodiment of the present invention in a fully engaged position (but not attached to a recessed cover). As shown in this embodiment of the present invention, the lower base 501 is replaced with a cam 1503 with and orifice 1504. As shown the cam 1503 may have an extended face 1509 for engaging the undersurface or surface of a material when the lock system 300 is engaged.

FIG. 4 illustrates one embodiment of the present invention, of the upper lock system 2300, in cross sectional view. As illustrated, base 301 is preferably hollow with a solid bottom and hollow interior 103, and preferably constructed to have two sets of openings: the upper opening 302 and the small sphere openings 308. In many embodiments of the present invention the locking screw 201 can be constructed of variable sizes such that it will fit into various size upper base 301 through upper opening 302. As illustrated, in several preferred embodiments of the present invention, the locking screw 201 is constructed to have threading 211 on the outer edges which can engage the counter locking threads 309 that are located, in several embodiments of the present invention, in the upper opening 302 in a manner known in the art for threading engagement.

Figure 5:
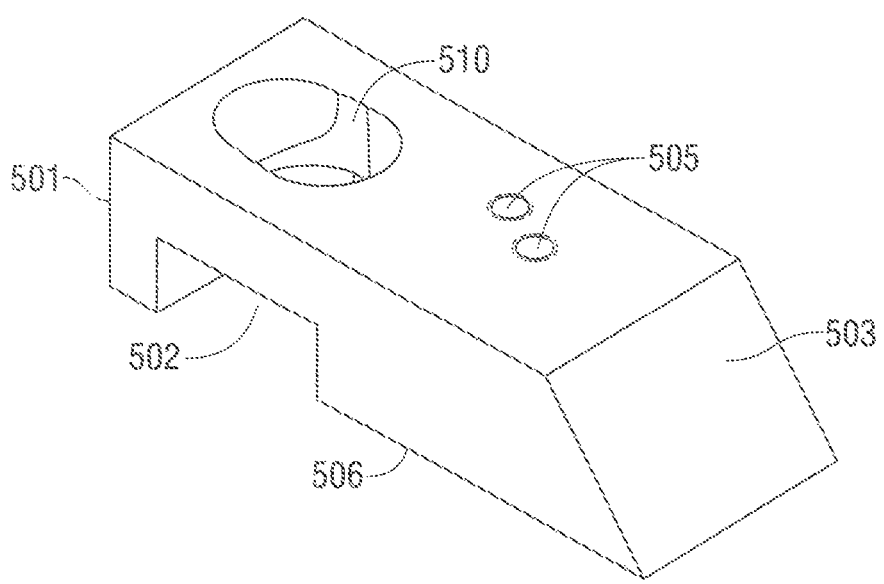
FIG. 5 illustrates an embodiment of the lower base of the present invention in partial side view.

FIG. 5 illustrates one embodiment of lower base 501 of the present invention. In several preferred embodiments, the present invention is a locking member that is designed to lock, or hold down recessed metal covers. FIG. 5 illustrates a side view of the lower base of one embodiment of the present invention. As shown the lower base 501 is a modified cuboid shape. However, it is envisioned that any substantial three dimensional shape could be used such as a modified rounded cuboid, a sphere, a modified ovoid, or other such shape. As illustrated, the lower base 501 has a semicuboid indention 502 on the lower face 506 of the lower base 501. However, it is envisioned that any substantial three dimensional shape could be used such as a modified rounded cuboid, a sphere, a modified ovoid, or other such shape. The lower base 501 also has a large orifice 510 which runs through the upper face 507 of the lower base 501 and through the semicuboid indention 502 as well. Also shown are the two pin orifices 505 for securing the extended member 401 when the extended member 401 is attached to the lower base 501.

In several embodiments of the present invention, it is envisioned that the lower base 501 maybe hollow, as illustrated in FIG. 5 or substantially solid in construction as shown in FIG. 1. Lower base 501 maybe constructed, in several preferred embodiments, to have an inclined plane 503 on one end of the lower base 501. It is envisioned though that the end of the lower base 501 with inclined plane 503 could have a recessed incline, or other three dimensional geometric shape, other than cuboid.

Figure 6:
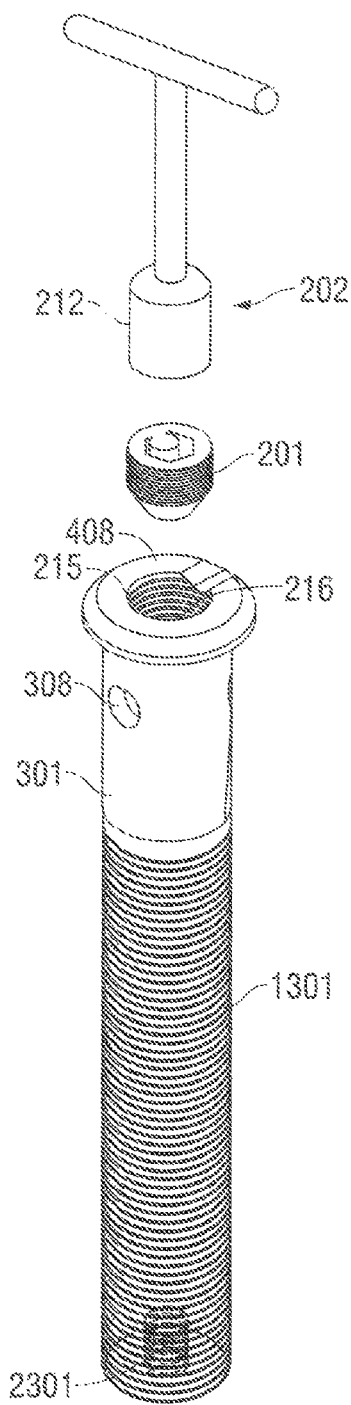
FIG. 6 illustrates an embodiment of the lower section in partial cross sectional side view.

FIG. 6 illustrates a partial side view, with partial cross section, of the upper base 301 of one embodiment of the present invention. As illustrated in this embodiment, the upper base 301 has a proprietary shaped cover 215 with an orifice 216. Orifice 216 can be of any geometric shape or design. Also illustrated is the key 202 with a male engaging member 212 which is preferably corresponding shaped to mechanically and releasably engage the orifice 216 such that the locking screw 201 may be rotated when the present lock system 300 is engaged. In one embodiment of the present inventive device, in operation this would mean that only persons with the proper tool could engage the locking screw 201. Also illustrated on the distal end of the upper base 501 from the proprietary face 408 is the hollowed portion of the lower section 1301. The hollowed portion of lower section 1301 also is internally threaded so it can receive the screw 603 when the present inventive device is assembled.

Figure 7:
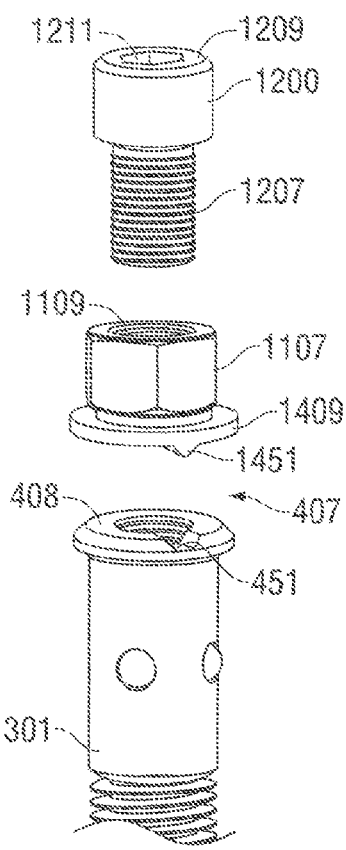
FIG. 7 illustrates an embodiment of the turn locking device of the present invention in exploded view.
Figure 8:
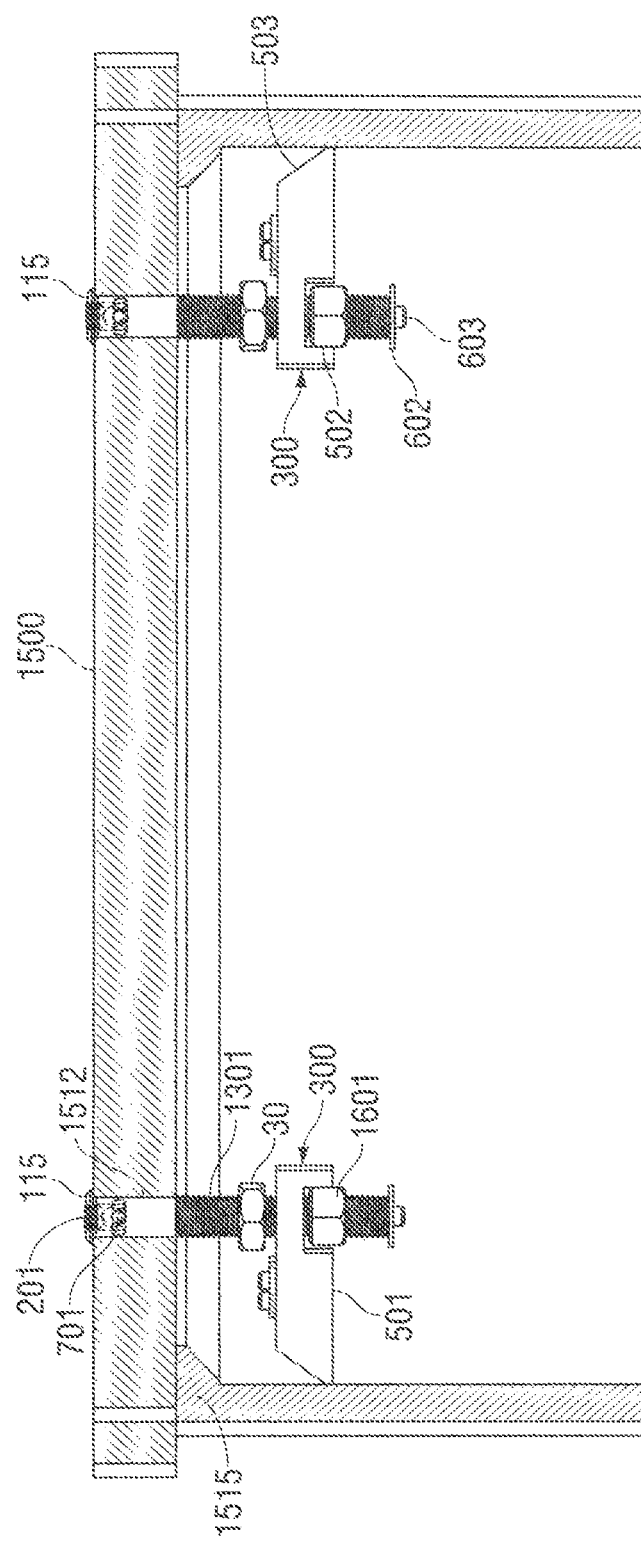
FIG. 8 illustrates an embodiment of the present inventive device as installed on a recessed cover with a frame.

FIG. 7 illustrates an exploded view of the turn locking device 407. As illustrated proprietary face 408 has an indention groove 451. The indention groove 451 is preferable designed, in some embodiments of the present invention, to mechanically interact with the male engagement member 1451 on the lower turn face 1107. Lower turn face 1107 is preferably constructed with a hollow threaded interior 1109. In several embodiments of the present invention, lower turn face 1107 may be constructed of iron, wood, steel, plastics, or other materials utilized for suitable applications. Lower turn face 1107 is also, in several embodiments, constructed with an engagement face 1409. Engagement face 1409 is preferably constructed to mechanically engage the proprietary face 408 when in operation. In several embodiments of the present invention, engagement face 1409 may be constructed of iron, wood, steel, plastics, or other materials utilized for suitable applications. Also illustrated is the engagement screw unit 1200. In several embodiments of the present invention, engagement screw unit 1200 may be constructed of iron, wood, steel, plastics, or other materials utilized for suitable applications. Engagement screw unit 1200, in some embodiments of the present invention, has a lower threaded member 1207, a turn base 1209 (with preferably a larger circumference than the lower threaded member 1207), and a turnkey engagement indentation 1211. When assembled, the engagement screw unit 1200 threads into the lower turn face 1107 through the lower threaded member and the hollow threaded interior 1109. The turn locking device 407 can then be place onto the engagement face 408. In some embodiments of the present invention the lower threaded member 1207 can thread through and attach directly to the upper base 301, in some embodiments of the present invention it is not necessary to have the lower threaded member 1207 thread though and become in mechanical communication with the upper base 301.

FIG. 8 illustrates one embodiment of the present invention being attached to a recessed cover 1500. As shown, recessed cover 1500 (a manhole in this case) is resting on the cover frame 1510. As shown, previously, the present inventive device 1200 has been applied to the cover 1500 through orifice 115. As shown, in this embodiment, the engagement face 408 preferably, is in mechanical communication with the cover top 1580. The lower base 307 penetrates through the orifice 115 on the cover and extends below to the cover bottom 1590. As illustrated in this embodiment of the invention the lower base 501 is firmly and mechanically engaged with the lower frame lip 1515. Also illustrated is interior wall 1512 of the cover 1500. In some embodiments when the present inventive device is engaged, the small spheres 701 extrude from the upper base 301 and mechanically engage the interior wall 1512 thereby preventing the upper base 301 from being further rotated of tampered with.

In one embodiment of the present inventive device, the present inventive device is installed onto a cover 1500 with a frame 1510 as follows. The cover 1500 is place in a convenient spot to begin work. In certain embodiments of the present invention, preliminary measurements are taken to establish an approximate location for holes to be drilled in the cover 1500, and at least one hole is then drilled into the cover 1500, in the standard method known in the art. In other embodiments, holes are already predrilled into the cover 1500. After the hole(s) are in the cover 1500 the upper base 301 is inserted into the hole(s), known as orifice(s) 115. At this time, the upper nut 30 is attached to the lower section 1301 so that the cover 1500 separates the proprietary face 407 from the upper nut 30. In many embodiments of the present invention, the upper nut 30 acts as a stop so it is placed at a premeasured height on the thread 1301 to provide maximum locking tension. At this point, the lower base 501 (with the extended member 401 already attached) is placed below the upper nut 30 but with the lower section 1301 running through the large orifice 510 so that the lower section 1301 extrudes from the base 501. The lower nut 1601 is then threaded on to the lower section 1301. In many embodiments of the present invention it is preferable to have some space on the thread between the lower nut 1601 and the base 501. After lower nut 1601 is attached the washer 602 and then the screw 603 are attached.

In one embodiment of the present inventive device, the present inventive device is installed onto a cover 1500. The cover 1500 is place in a convenient spot to begin work. In certain embodiments of the present invention, preliminary measurements are taken to establish an approximate location for holes to be drilled in the cover 1500, and at least one hole is then drilled into the cover 1500, in the standard method known in the art. In other embodiments, holes are already predrilled into the cover 1500. After the hole(s) are in the cover 1500 the upper base 301 is inserted into the hole(s), known as orifice(s) 115. At this time, the upper nut 30 is attached to the lower section 1301 so that the cover 1500 separates the proprietary face 407 from the upper nut 30. In many embodiments of the present invention, the upper nut 30 acts as a stop so it is placed at a premeasured height on the thread 1301 to provide maximum locking tension. At this point, the cam 1503 is placed below the upper nut 30 but with the lower section 1301 running through the large orifice 1504 so that the lower section 1301 extrudes from the cam 1503. The lower nut 1601 is then threaded on to the lower section 1301. In many embodiments of the present invention it is preferable to have some space on the thread between the lower nut 1601 and the cam 1503. After lower nut 1601 is attached the washer 602 and then the screw 603 are attached.

In one embodiment of the present inventive device, the present inventive device, once installed onto a cover 1500 is operated in the following manner. Once installed on the cover 1500, the entire turnkey unit 407 is put into mechanical communication with the proprietary engagement face 408. The indention grove 451 is aligned with the male mating member 1451. At this point, in some embodiments of the present invention the male engagement face for the engagement screw unit 1200 is then inserted into indention 121 and rotated. The rotation of the screw unit 1200 will cause the rotation of the upper base 301. In many embodiments of the present invention, the upper nut 30 acts as a stop so it is placed at a premeasured height on the thread 1301 to provide maximum locking tension. In some embodiments an additional lock washer is placed between nut 30 and the lower base 501, or cam 1503, to prevent further stop of upward movement of the base 501 or cam 1503 going up the thread 1301. The rotation of the upper base 301 will cause the upper nut 40 to move and the lower nut 1601 to move into mechanical communication with large washer 1507. This insertion by the lower nut 1601, will cause the cam 1503 to rotate as well. As the cam 1503 is rotating it will rotate up the thread if the lower section 1301 is being rotated one direction and down the lower section 1301 if rotated the other direction. Once the cam 1503 is sufficiently rotated up the thread, the extended face 1509 will engage the lower frame wall 1515, or and solid materials, such as concrete, into which the extended face 1509 comes into contact and stop the rotation of the cam 1503. At this time further torque on the thread will cause the lower nut 1601 to rotate and then firmly engage the large washer 1507 therein prevention any further rotation of the lower nut 1601.

In one embodiment of the present inventive device, the present inventive device, once installed onto a cover 1500 with a frame 1510, is operated in the following manner. Once installed on the cover 1500, the entire turnkey unit 407 is put into mechanical communication with the proprietary engagement face 408. The indention grove 451 is aligned with the male mating member 1451. At this point, in some embodiments of the present invention the male engagement face for the engagement screw unit 1200 is then inserted into indention 121 and rotated. The rotation of the screw unit 1200 will cause the rotation of the upper base 301. The rotation of the upper base 301 will cause the upper nut 40 to move and the lower nut 1601 to insert itself partially into the semicuboidal indention 502. In many embodiments of the present invention, the upper nut 30 acts as a stop so it is placed at a premeasured height on the thread 1301 to provide maximum locking tension. In some embodiments an additional lock washer is placed between nut 30 and the lower base 501, or cam 1503, to prevent further stop of upward movement of the base 501 or cam 1503 going up the thread 1301. This insertion by the lower nut 1601, will cause the lower base 501 to rotate as well. As all the lower base 501 is rotating it will rotate up the thread if the lower section 1301 is being rotated one direction and down the lower section 1301 if rotated the other direction. Once the lower base 501 is sufficiently rotated up the thread, the inclined plane 503 will engage the lower frame wall 1515 and stop the rotation of the lower base 501. At this time further torque on the thread will cause the lower nut 1601 to rotate and then firmly situate itself into the semicuboidal indention 502 there in prevention any further rotation of the lower nut 1601.

In order to disengage the present inventive device from operation, the aforementioned steps found in paragraphs [0048 or 0049] are reversed. In order to uninstall the present inventive device from a cover, the aforementioned steps found in paragraphs [0046 or 0047] are reversed.

In one embodiment of the present inventive device, the present inventive device can be utilized as above, but with additional locking features. In this embodiment, after the aforementioned steps for operation are engaged the additional steps for further engagement can be undertaken. In order to further engage the present inventive device, the user need to insert the key 202 into the engagement cover 215 and rotate the key 202 in relation to the locking screw 201 therein causing the locking screw 201 to rotate and push downward on the large sphere(s) 601. In several embodiments of the present invention, the locking screw 211, when rotated, will push on the large sphere(s) 601 causing it to move the small spheres 701 outward and through the small sphere openings 308 and mechanically engage the interior wall 1003 of the orifice 115 therein preventing the upper base 507 from being rotated further or removed from the orifice 115.

In order to disengage the present inventive device, after the additional locking features are enabled, the key 202 is reinserted into the cover engagement cover 215 and counter-rotated thereby causing the locking screw 201 to counter-rotate upwards which allows the large sphere(s) 601 to move and small spheres 701 to retract into the base 301 and disengage. In some embodiments of the present invention, the counter rotation of cover 215 breaks the downward tension on sphere(s) 601 and thus allows small spheres 701 to retract back into small sphere openings 308. This break in tension allows for the free movement of the present invention.

As illustrated in FIGS. 1 and 2, in one embodiment of the present invention, without a cover, the present invention is assembled in the following manner. In one embodiment, the invention has a cylindrical base 301, although other geometric shapes can be used in the present invention, including cubes, spheres, cones, cylinders or other solid shapes, into which there are preferably two sets of openings the upper opening 302 and the small sphere openings 308. In one preferred embodiment the small spheres 701 are placed into the hollow interior 103 of the base 301. It is preferable that the amount of small spheres 701 correspond with the same number of small sphere openings 308. The small sphere openings 308 are preferably designed to be of a smaller diameter than the small spheres 701, so the small spheres 701 will not fall out of the inventive locking system 300 when the locking system 300 is in use. In some embodiments of the present invention, the small sphere openings 308 are pinched or mechanically squeezed to make a smaller circumference after the small spheres 701 are inserted, this prevents the small spheres 701 from falling out of the locking system 300, when the base is removed. At this point, in one embodiment of the invention, the large sphere(s) 601 are placed into the base 301. It is preferable that in many embodiments of the present invention the large sphere(s) 601 are of a larger diameter than the small spheres 701. In several embodiments of the present invention, several large sphere(s) 601 maybe used and stack on top of each other in the base 301. In several embodiments of the present invention, after the large sphere(s) 601 is inserted then the locking screw 201 with locking threading 211 is screwed onto the base 301 in mechanical communication with locking threads 309.

Once the spheres are installed, the upper base 301 is then threaded on the upper nut 45. The lower base 501 is prepared by installing the extended member 401 on the lower base 501 by screws 412 through the orifices on the extended member 401 and the lower base 501. The lower base 501 is then attached to the upper base 301 by putting the lower section 1301 through the large orifice 510 on the lower base 501. It should be noted, that in many embodiments of the present invention, nut 30 is threaded onto the lower section 1301 prior to the lower nut 1601 being threaded onto the lower section 1301. The lower nut 1601 is then threaded on to the lower thread. In many embodiments of the present invention it is preferable to have some space on the thread between the lower nut 1601 and the base 501. After lower nut 1601 is attached the washer 602 and then the screw 603 are attached. This washer is necessary to prevent the over loosening of 501 and thus is coming off the lower section 1301. This washer 602 and screw 603 are in place to prevent just that, the accidental over loosening of base 501 and thus is coming off.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is the following:

1. A lock comprising:
    a hollowed three dimensional top base with a hole in a top region, multiple holes in the side region adjacent to the top region, and a threaded lower region;
    a lower three dimensional base with a large orifice;
    a upper nut;
    a lower nut;
    several small spheres of larger diameter than the multiple holes in the side region;
    at least one large sphere of larger diameter that the small spheres;
    a locking screw which can be inserted into the hole in the top region of said upper base;
        said locking screw mechanically engage with said large sphere such that when rotated said locking screw causes the large sphere to move relative to the locking screw and to force said small spheres to extrude from said base via said multiple holes;
        said threaded lower region is threaded with said upper nut;
        said threaded lower region is inserted in mechanical communication with said large orifice of said lower base with a region of said threaded lower region extruding through said lower base;
        said lower nut is threaded with said threaded lower region extruding through said lower base,
    an extended member with several orifices;
    attachment pins;
        said extended member is attached to said lower base by inserting said attaching pins through said orifices of said extended member and then through said smaller orifices of said lower base;
    wherein when rotated said extended member prevents additional rotation when in contact with a solid barrier.

2. The lock of claim 1 further comprising;
    said hole in top region is threaded; and
    said locking screw is threaded to mechanically engage with said hole in top region.

3. The lock of claim 2 further comprising;
    said top region has and engagement face.

4. The lock of claim 3 further comprising;
    a turnkey unit with male engagement member for engaging said engagement face.

5. The lock of claim 1 further comprising;
    said upper base is substantially cylindrical in shape.

6. The lock of claim 1 further comprising;
    said lower base is a cam.

7. A lock comprising:
    a hollowed three dimensional top base with a hole in a top region, multiple holes in the side region adjacent to the top region, and a threaded lower region;
    a lower three dimensional base with a large orifice;
    an upper nut;
    a lower nut;
    several small spheres of larger diameter than the multiple holes in the side region;
    at least one large sphere of larger diameter that the small spheres;
    a locking screw which can be inserted into the hole in the top region of said upper base;
        said locking screw mechanically engage with said large sphere such that when rotated said locking screw causes the large sphere to move relative to the locking screw and to force said small spheres to extrude from said base via said multiple holes;
        said threaded lower region is threaded with said upper nut;
        said threaded lower region is inserted in mechanical communication with said large orifice of said lower base with a region of said threaded lower region extruding through said lower base;
        said lower nut is threaded with said threaded lower region extruding through said lower base;
    a key with a male interface in a unique geometric configuration;
        said locking screw further comprises
    a cover for said locking screw;
        said cover further comprising:
    a female interface with a unique geometric configuration designed to interface with said key.

8. The method for use of a lock comprising;
    providing a lock system comprising;
        a hollowed three dimensional top base with a hole in a top region, multiple holes in the side region adjacent to the top region, and a threaded lower region;
        said top region has and engagement face,
        a turnkey unit with male engagement member for engaging said engagement face,
        a lower three dimensional base with a large orifice and two small orifices;
        a upper nut;
        a lower nut;
        an extended member with several orifices;
        attachment pins;
        several small spheres of larger diameter than the multiple holes in the side region;
        at least one large sphere of larger diameter that the small spheres;

a locking screw which can be inserted into the hole in the top region of said base;
- said locking screw mechanically engage with said large sphere that when rotated said locking screw causes the large sphere to move relative to the locking screw and to force said small spheres to extrude from said base via said multiple holes;
- said threaded lower region is threaded with said upper nut;
- said threaded lower region is inserted in mechanical communication with said large orifice of said lower base with a region of said threaded lower region extruding through said lower base;
- said lower nut is threaded with said threaded lower region extruding through said lower base;

mechanically attaching said turnkey unit with male engagement member for engaging said engagement face to said engagement face therein rotating said turnkey unit with male engagement member for engaging said engagement face;
- wherein said rotation of the turnkey unit with male engagement member for engaging said engagement face upper base will cause the engagement face to stop when it contacts said upper nut and the lower nut to insert itself partially into the semicuboidal indention causing the lower base to rotate, and rotate up the lower threaded region;
- wherein when fully rotated said lower base prevents additional rotation when in contact with a solid barrier.

9. The method for use of a lock of claim 8 further comprising;
- engaging said lower base with a frame wall by said rotation up the lower threaded region.

10. The method for use of a lock of claim 9 further comprising;
- disengaging said lower base with a frame wall by said counter rotation down the lower threaded region.

11. The method for use of a lock of claim 8 further comprising;
- a locking screw which can be inserted into the hole in the top region of said base;
- rotating said locking screw mechanically so as to engage with said large sphere such that when rotated said locking screw causes the large sphere to move relative to the locking screw and to force said small spheres to extrude from said base via said multiple holes and engage the inner tubular wall.

12. The method for use of a lock of claim 11 further comprising;
- counter-rotating said locking screw so that small spheres retract into said base.

* * * * *